April 1, 1930. S. P. MILLER 1,752,921
PROCESS OF AND APPARATUS FOR POLYMERIZING OILS
Filed Jan. 23, 1925
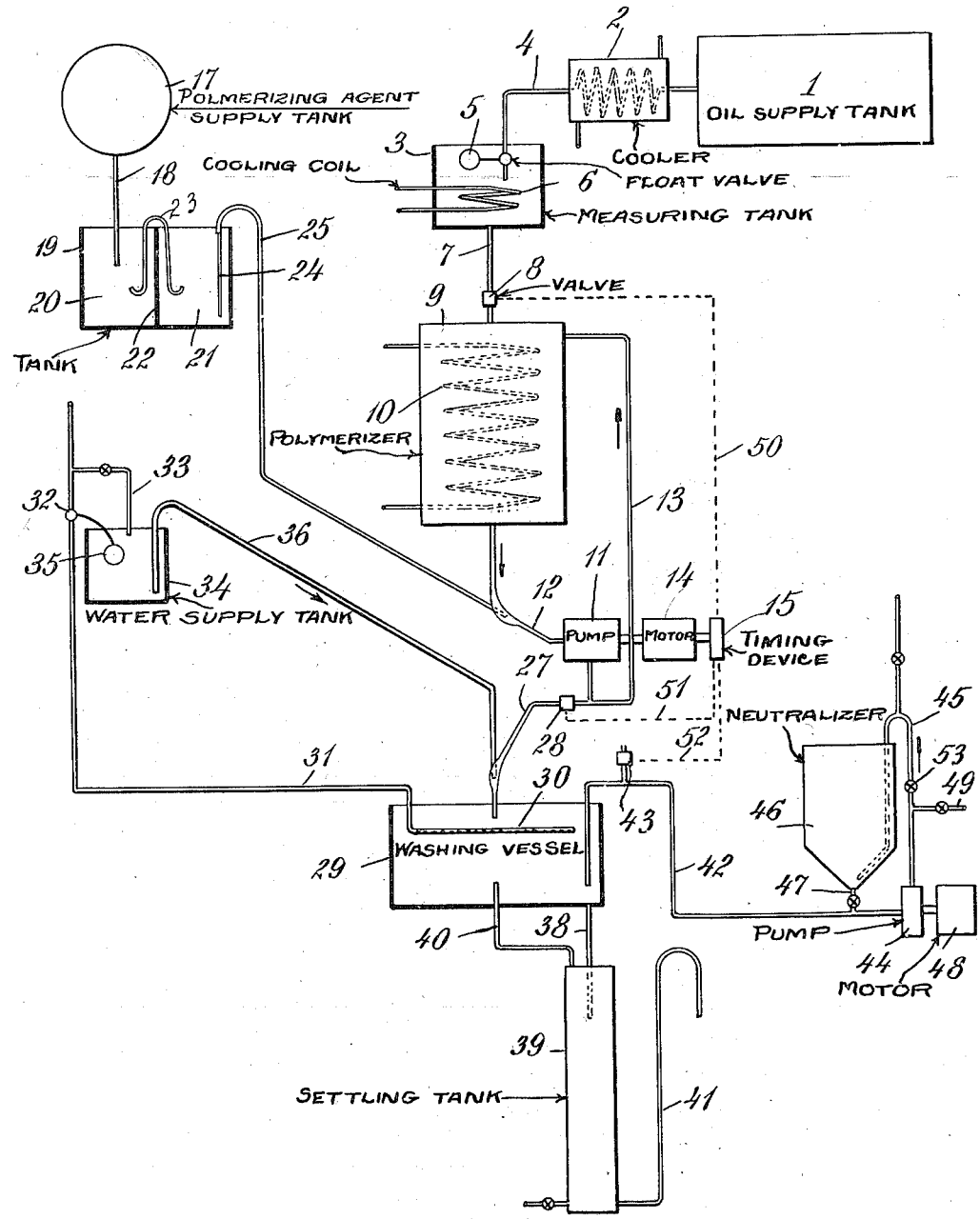

Patented Apr. 1, 1930

1,752,921

UNITED STATES PATENT OFFICE

STUART P. MILLER, OF PHILADELPHIA, PENNSYLVANIA, ASSIGNOR TO THE BARRETT COMPANY, A CORPORATION OF NEW JERSEY

PROCESS OF AND APPARATUS FOR POLYMERIZING OILS

Application filed January 23, 1925. Serial No. 4,141.

This invention relates to an apparatus and process, for carrying out chemical reactions or for intermittently mixing liquid materials, so that the various ingredients are automatically added to a mixing device in measured amounts at periodic intervals and that the mixture is automatically and periodically discharged from the mixing device. Auxiliaries to provide for automatically washing the mixture or for automatically controlling secondary operations, such as settling, re-cycling, etc. may also be provided. More specifically, the apparatus contemplates such a process as the polymerization of oils such as naphtha, the washing of naphthalene, the washing of benzol, or other hydrocarbons, the extraction of tar acids or of pyridine from oils, the nitration or sulfonation of benzol and similar operations.

With particular reference to the use of this invention in the polymerization of oils, such as naphtha, which contains polymerizable constituents which can be polymerized by treatment thereof with sulphuric acid, aluminum chloride, or other polymerizing agents, the oil or naphtha can be polymerized in batches in rapid succession, the operation being automatically timed, so that it is in effect a continuous one. The oil is introduced into a vessel called the polymerizer, which is equipped with a cooling device such as coils or a jacket or other means. The cooling device need not be in the polymerizer as the oil may be circulated through an auxiliary cooler. The oil is agitated as, for instance, by circulation by means of a pump or other device. The requisite amount of polymerizing agent is automatically added. After the oil and polymerizing agent have been agitated for the proper length of time, the mixture is withdrawn automatically to a tank where the spent polymerizing agent is automatically separated, together with any tar which separates out. The oil may, if desired, be automatically washed with a predetermined quantity of water. The apparatus is so arranged that the withdrawing of the mixture from the polymerizer causes the right amount of water to be sprayed upon the polymerized oil to wash the same sufficiently. The oil is then permitted to settle, the acid or other polymerizing agent and the water, if washing has been resorted to, being removed from the bottom of the settling tank and the polymerized oil being transferred to a vessel where the same is neutralized, for example, by means of caustic soda solution or other suitable alkali.

In a somewhat similar manner, the washing of naphtha, benzol, or other hydrocarbons, the extraction of tar acids or pyridine from oils, or the nitration or sulfonation of benzol may be carried out by using the same apparatus, merely changing the materials and the proportions of the batches thereof which are introduced into the mixing device.

The invention will be understood from the description in connection with the accompanying drawing which shows somewhat diagrammatically an arrangement of apparatus for carrying out the invention in the polymerization of oils or naphthas.

In the drawings, reference character 1 indicates a supply tank for the oil which may be crude heavy solvent naphtha, for example. The oil is passed from the tank 1 through a cooler 2 into a measuring tank 3. The size of tank 3 as well as the size of compartment 21 depends upon the ratio of the batches of materials to be introduced into the polymerizer itself. The polymerizer itself is always slightly larger than the combined volume of tank 3 and compartment 21. A pipe 4 provided with a float valve 5 leads from the cooler 2 to the tank 3 and as soon as the tank is filled to the proper extent, the float valve closes. The tank 5 may be provided with a cooling coil 6 through which any suitable cooling medium, as for instance, calcium chloride brine, may be passed. A pipe 7 provided with a valve 8 leads from the tank 3 to the polymerizer 9 which is provided with a cooling coil 10 of sufficient capacity preferably to maintain the contents at about 0° C. during the operation. The polymerizer 9 is provided with a pump 11 which maintains circulation of the contents through the outlet pipe 12 and the inlet pipe 13. The pump is driven by a motor 14 in connection with which a timing device 15 to be described later, is used.

An air-tight supply tank for the polymerizing agent such as sulfuric acid, for example, is shown at 17 and has a pipe 18 leading into a tank 19 divided into compartments 20 and 21 by means of the partition 22. The lower end of the pipe 18 is sealed by the liquid in the compartment 20 when it reaches the proper level and a siphon 23 transfers the liquid, at the proper time, from compartment 20 to compartment 21. A siphon leads from the compartment 21, this siphon being composed of a small pipe 24 as shown which joins a larger pipe 25 and the lower end of the pipe 25 extends into the outlet pipe 12 from the polymerizer. The discharge capacity of the siphon 24, 25 is much greater than that of siphon 23, for a purpose hereinafter to be described.

A discharge pipe 27 provided with a valve 28 leads from pipe 13 into a washing vessel 29 where the contents may be washed by means of the spray 30 connected to a water supply pipe 31. This spray is caused to operate periodically by successive opening and closing of the float valve 32 in the water supply tank 34. A valved auxiliary pipe 33 leads from the water supply tank 31 to the tank 34, the water in the tank 34 operating the float 35 to open and close the valve 32. The admission of water through the pipe 33 into tank 34 is so valved that the tank 34 will just fill, in its chosen cycle. Siphon 36, having a much greater discharge capacity than that of the valved pipe 33, leads from the tank 34, its lower end extending inside the outlet pipe 27. This siphon is started by the discharge of oil from the polymerizer into washer 29.

A pipe 38 leads from one bottom of the washer 29 into the top of the settling tank 39 extending about 12" below the top and a pipe 40 extends from the top of tank 39 to about 6" above the bottom of vessel 29. An outlet pipe 41 leads from the bottom of the settling tank upward to a definite level and acts as a constant overflow.

A pipe 42 having a vent with a valve 43 therein controlled by the timer 15 leads from the washer 29 to the pump 44 from which a vented pipe 45 leads to the bottom of the neutralizer 46 and a valved pipe 47 leads from the bottom thereof back to the pipe 42. The pump 44 is driven by a motor 48. A valved branch pipe 49 and cock 53 are provided for emptying the contents into a storage tank or reservoir when desired.

The timer 15 may be one of the ordinary ones commonly in use in which electric contacts are made at proper intervals for opening and closing the electric circuits indicated by the dotted lines 50, 51 and 52 which lead to solenoids or small motors connected to the valves 8, 28 and 43 respectively, so that these valves can be opened and closed at proper intervals to suit the conditions under which the apparatus is to be used. It should be understood that I do not limit myself to any particular form of timing device.

The operation is as follows: Naphtha or oil containing polymerizable constituents that are to be polymerized pass from the supply tank 1 through the cooler 2 into the tank 3 until the float valve 5 causes the supply to be shut off. The material is kept cool in the tank 3 by means of the coil 6 and the valve 8 is opened by the timing device 15 for a sufficient length of time to permit the contents of the tank 3 to be discharged into the polymerizer 9 whereupon the timing device 15 causes the valve 8 to close again and the tank 3 becomes automatically filled to the proper extent for the second charge. The pump 11 causes the material to circulate through the pipes 12 and 13 thus causing suction upon the lower end of the siphon 25 and causing the contents of the compartment 21 of the tank 19, or the sulfuric acid in case sulfuric acid is used as the polymerizing agent, to be rapidly discharged from the compartment 21 into the circulating system and to become mixed with the oil to be polymerized and to be circulated by means of the pump 11. The cooling coil 10 causes the temperature to be kept sufficiently low during the polymerizing reaction to avoid undesirable reactions. Upon the discharge of the material from compartment 21 to the level of the lower end of pipe 24, air is thereby admitted to the siphon 24, 25 whereupon it "breaks," discontinuing the rapid discharge of material from compartment 21. When the acid in compartment 21 is discharged the siphon 23 will supply acid from compartment 20. During the interval when suction upon the line 25 ceases, because of the complete discharge of material from the polymerizer, the compartment 21 will refill. As soon as the level of the liquid in the compartment 20 goes below the lower end of the pipe 18, more of the liquid or sulfuric acid passes out of the supply tank 17 into the compartment 20 because of the admission of air through the unsealed pipe 18 to the tank 17.

As soon as the oil and acid have been circulated by means of the pump 11 the desired length of time, the timing device 15 causes the valve 28 to open and let the mixture be discharged into the washer 29. The discharge of the material through the pipe 27 causes suction upon the pipe 36 thus almost instantaneously emptying the water from the tank 34 and permitting the float 35 to open the valve 32 which will cause the water to pass through the pipe 31 and sprayer 30 thereby washing the contents of the washer 29. The valve in the auxiliary pipe 33 is so adjusted that the tank 34 will fill sufficiently rapidly to cause the float 35 to close the valve 32 as soon as sufficient water has passed through the pipe 31 to wash the mixture in the washer 29. The washed mixture is permitted to drain through the pipe 38 into the settling tank 39, the polymerized oil, of course, rising to the top and through the line 40 into washer 29 and the spent acid and water settling to the bottom from whence they may be withdrawn through the pipe 41 and permitted to go to waste. The difference in level of the material in the tank 29 and the curve in the pipe 41 is such that the weight of the column of water in pipe 41 is substantially equal to the column of water and oil in tank 39, pipe 38 and tank 29. Thus when washing ceases the polymerized oil may be withdrawn through the pipe 42.

The neutralizer 46 contains caustic soda solution for neutralizing the polymerized oils and is kept in circulation by means of the pump 44. The valve 47 restricts the outlet from the neutralizer to such an extent that when the vent 43 is closed sufficient suction will be produced upon the pipe 42 to withdraw the polymerized oil from the washer 29. The timer 15 is so set that the valve 43 in the vent will be open while the washing and settling operation is continuing, but the valve 43 will be closed when it is desired to withdraw the polymerized oil from the washer 29 into the neutralizer 46. The polymerized oil may be permitted to accumulate in the neutralizer 46 and be withdrawn through the outlet pipe 49 whenever desired. It is understood, of course, that immediately after the mixture of oil and polymerizing agent is withdrawn through the pipe 27, the timing device closes the valve 28 and opens the valve 8 so that the second batch begins to be treated in the same way as above described for the first batch and so on continuously.

If desirable, the addition of the polymerizing agent, and the operation of the water spray may be controlled by timing devices, such as the solenoid system mentioned for operating valves 8, 43 and 28.

It should be stated that I do not limit myself to the exact combination of parts as herein disclosed. It may, for instance, be found desirable to eliminate the washing, the continuous acid separation, and the automatic neutralizing, and to allow the polymerized oil and the used polymerizing agent to accumulate in a vessel for later disposal.

While I have described the application of my invention to the polymerizing of oils or naphthas, it is obvious that it is applicable also to the washing of naphthalene, benzol, or other hydrocarbons and to the extraction of tar acids or pyridine from oils. In such an event, I may only desire to employ a portion of the apparatus, leaving out the washing, settling and neutralizing apparatus or steps described above.

For instance, if I desire to wash benzol or other liquid hydrocarbon, the hydrocarbon will be introduced into the measuring tank 3 and the washing material such as sulphuric acid into the compartment 21 both in the proper proportions. These will then be introduced into the mixing device 9 and thereafter be discharged into any desirable tank for settling or further treatment.

Tar acids or pyridine may be separated from the oils containing them by introducing the oil into a measuring tank 3 and the reacting agent into a compartment 21, both in the proper proportions, and thereafter introducing these materials into a mixing device 9 and thereafter discharging the mixture into any desirable tank for settling or further treatment. If further treatment is desired, it may be accomplished by timed devices such as the washing vessel or neutralizer above described. The nitration or sulfonation of benzol may be carried out in a similar manner.

If it is desired to wash naphthalene, it is merely necessary that it be introduced into the mixing device 9 in a molten condition. Cooling by means of the coils 2, 6 and 10 would therefore be preferably omitted so that the naphthalene would remain liquid until it is thoroughly mixed with its washing material as in the case of the materials previously described. The washing material would be introduced in the compartment 21 as contemplated with the aforementioned process and the washed material, crystallizing during the aforesaid treatment and suspended in the washing material, would be discharged from the mixing device 9 into a suitable settling tank.

It is also possible with my invention to recycle the mixed material or to place in series, a number of my measuring and mixing devices all controlled by the same timing device.

I claim:

1. In combination, a mixing device, means for periodically introducing a predetermined amount of material to be treated into said mixing device, means for circulating the material in said mixing device, a supply of treating agent arranged to discharge into said mixing device, and means controlled by the circulation of material in the mixing device for feeding a predetermined amount of treating agent from said supply into said mixing device, the operation of said last named means being initiated by the circulation of material in said mixing device.

2. In combination, a mixing device, a plurality of measuring tanks, means for causing a flow of material from one of said measuring tanks into and through said mixing device, means connecting the other of said measuring tanks with said mixing device and means for discharging the material from the other of said measuring tanks through said connection means into said mixing device, said latter means being initiated and controlled by the flow of said material into and through said mixing device.

3. In combination, a mixing device, a measuring tank arranged to contain material to be treated, means for feeding the material from said tank into said mixing device, means for circulating the material in said mixing device, a second measuring tank arranged to contain a treating agent and means for initiating the feed of said treating agent into said mixing device by the circulation of said material.

4. In combination, a mixing device, a plurality of measuring tanks and uni-controlled means for periodically discharging said measuring tanks into said mixing device and for periodically discharging said mixing device.

5. In combination, a mixing device, a plurality of measuring tanks and uni-controlled means for periodically discharging said measuring tanks into said mixing device and for periodically discharging said mixing device, the periodicity of discharge of the plurality of measuring tanks and mixing device alternating.

6. In combination, a mixing device, a measuring tank containing an oil having polymerizable constituents, a measuring tank containing a polymerizing agent, said tanks communicating with said mixing device, means for permitting the discharge of said measuring tanks into said mixing device, a valve for permitting the discharge of said mixing device and single means for operating said discharge means and valve.

7. In combination, a mixing device, a plurality of measuring tanks in communication with said mixing device, means for permitting the discharge of said measuring tanks into said mixing device, a supply line in communication with a discharge line for said mixing device, a valve for permitting the discharge of said mixing device and supply line and a single means controlling said discharge means and valve.

8. In combination, a mixing device, a measuring tank containing an oil having polymerizable constituents, a measuring tank containing a polymerizing agent, said tanks communicating with said mixing device, means for permitting the discharge of said measuring tanks into said mixing device, a supply line leading from said second mentioned tank into communication with a discharge line for said mixing device, a valve for permitting the discharge of said mixing device and supply line and a single means for separately and periodically operating said discharge means and valve.

9. In combination, a mixing device, a plurality of measuring tanks in communication with said mixing device, a plurality of supply tanks in communication with said measuring tanks respectively, means interposed between said measuring tanks and the mixing device operable to control the discharge of material into the mixing device and means interposed between said measuring and supply tanks controlled by the material in said measuring tanks.

10. The method of treating crude hydrocarbons which comprises periodically introducing a definite amount of the crude material and a definite amount of a treating agent into an agitator and agitating said materials for a definite length of time, the introduction of the treating agent being effected by the agitation of the crude material in the agitator.

11. The method of treating crude hydrocarbons which comprises periodically introducing a definite amount of the crude material and a definite amount of a treating agent into an agitator, agitating said materials for a definite length of time, the introduction of the treating agent being effected by the agitation of the crude material in the agitator, discharging the materials from the agitator and then separating the purified hydrocarbon from the mixture.

12. The process of polymerizing oil containing polymerizable constituents, which comprises periodically introducing a definite amount of the oil and a definite amount of a polymerizing agent into a circulating system, circulating the oil and agent and periodically discharging the circulating system, the introduction of the polymerizing agent into the circulating system being effected by the circulation of the oil.

13. The process of polymerizing oil containing polymerizable constituents, which comprises periodically introducing a definite amount of the oil and a definite amount of a polymerizing agent into a circulating system, circulating the oil and polymerizing agent, the introduction of the polymerizing agent into the circulating system being dependent upon the circulation of the oil, separating the oil and spent agent and periodically neutralizing the oil.

14. The process of polymerizing oil which comprises periodically introducing a definite amount of polymerizable oil and a definite amount of a polymerizing agent and agitating said oil and agent for a definite length of time, the introduction of the polymerizing agent being automatically initiated and controlled by the agitation of the oil.

15. The process of polymerizing oil containing polymerizable constituents which comprises introducing a definite amount of polymerizable oil and a definite amount of a polymerizing agent into a circulating system, circulating the oil and agent, the introduction of the polymerizing agent into the circulating system being effected by the circulation of the oil, withdrawing the polymerized mixture periodically from the circulating system, separating the polymerized oil from the spent polymerizing agent, washing said mixture and then neutralizing said oil.

16. In apparatus for polymerizing oil containing polymerizable constituents, means for introducing oil and polymerizing agent into a cooling agitator, means for discharging the polymerizer contents into an acid separator, a neutralizing tank, means for removing oil from the acid separator to neutralizing tank, all being periodically operated and the periodicity of each being predetermined and fixed to provide for a completely synchronized unit for repetitive batch operation.

17. The process of polymerizing oil containing polymerizable constituents which comprises introducing oil and a polymerizing agent into an agitator, the introduction of the polymerizing agent being initiated by the flow of oil in the agitator and agitating the oil and agent.

18. The process of polymerizing oil containing polymerizable constituents which comprises periodically introducing a definite amount of polymerizable oil and a definite amount of polymerizing agent into an agitator, the introduction of the polymerizing agent being initiated and controlled by the flow of oil in the agitator, agitating the oil and agent, periodically withdrawing the polymerized mixture from the agitator, separating the polymerized oil from the spent polymerizing agent, washing said mixture and then neutralizing said oil.

In testimony whereof I affix my signature.

STUART P. MILLER.